Jan. 12, 1937.   F. C. RAUWENHOFF   2,067,342
METHOD FOR MAKING ELECTRICALLY WELDED CHAIN LINKS
Filed Aug. 24, 1935   2 Sheets-Sheet 1
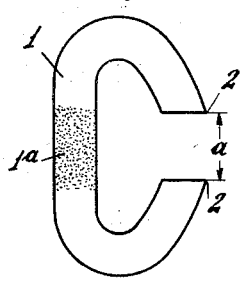
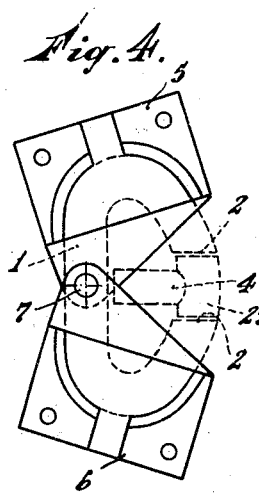
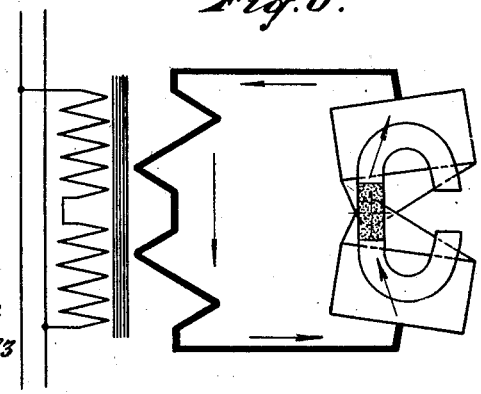
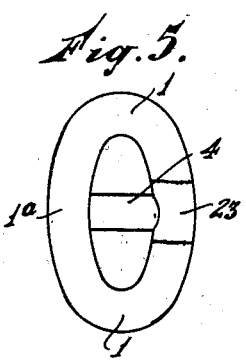
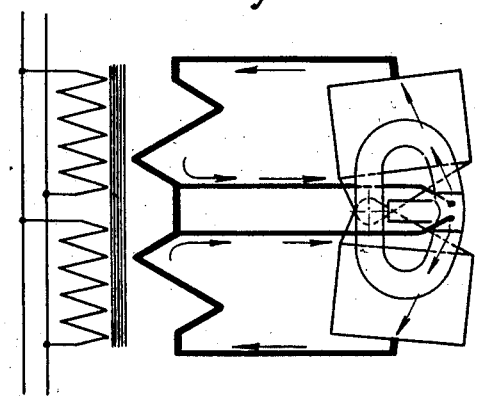
F. C. Rauwenhoff
Inventor
By: Glascock Downing Seebold
Attys.

F. C. Rauwenhoff
Inventor

By: Glascock Downing & Seebold
Attys.

Patented Jan. 12, 1937

2,067,342

UNITED STATES PATENT OFFICE 2,067,342

METHOD FOR MAKING ELECTRICALLY WELDED CHAIN LINKS

Frans Christiaan Rauwenhoff, Oegstgeest, Netherlands, assignor to Naamlooze Vennootschap: Koninklijke Nederlandsche Grofsmederij, Leiden, Netherlands, a corporation of the Netherlands Application August 24, 1935, Serial No. 37,756

2 Claims. (Cl. 219—10)

The invention relates to a method for making electrically welded chain links by the flash welding system.

Methods are known in which a link body is provided with a gap at one side. Into this gap a closure or filling piece is pressed by exerting a pressure upon it directed perpendicularly to the plane of the link. During this pressing action electrical welding current is passed through and the filling piece is welded in the gap of the C-shaped link body.

The object of the invention is to vary these known methods in such a way that flash welding may be applied in order to secure a uniform heating and an entire contact of the surfaces to be welded.

According to the invention a metal rod is initially bent in the shape of a C and an electric current is passed through the back portion of the C-shaped rod to heat it. The filling piece being positioned in the gap between the ends of the C-shaped rod, the back of the latter is bent to press the end faces thereof against the ends of said filling piece. Welding current is now applied to both ends of the C and to the filling piece, the current applied to both ends of the C-shaped rod having the same polarity, differing from the polarity of the filling piece.

This method may be applied for making plain-links as well as stud-links. In the latter case the filling piece has the shape of a T, the long leg of which constitutes the stud. The end thereof is electrically insulated at the inner side of the link, so that the welding current is compelled to take its way through the short leg of the T, forming the filling proper in the gap. As an insulating means various substances may be used such, for instance, as mica or a mixture of dextrine and chalk. In particular this latter substance has given good results in practice.

The invention will be more fully understood with reference to the partially diagrammatic drawings illustrating embodiments of links and of a machine according to the invention.

Figs. 1, 2, and 3 show various parts of a link.

Fig. 4 is a schematic view of machine parts serving to bend the link.

Fig. 5 shows the link after the welding and the deburring operation.

Figs. 6 and 7 illustrate two stages of the method.

Figure 8:
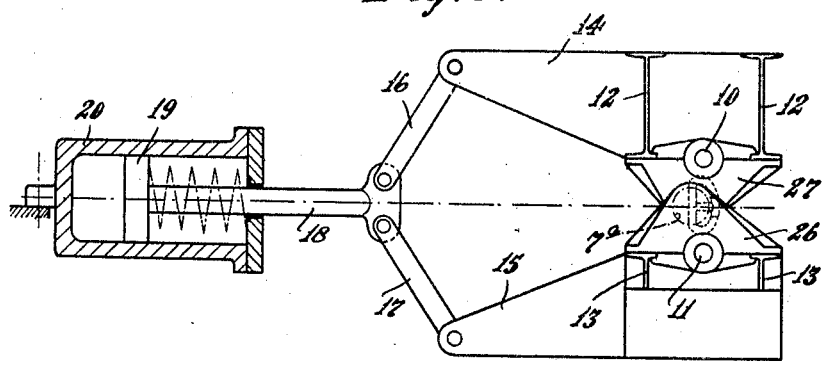
Fig. 8 shows the device for the bending of the link ends during the welding operation.

In Fig. 1 the shape of the link body $1$ is shown, which shape is obtained by bending a rod of round steel to the illustrated shape after heating up to about 600° C. in a hydraulic bending machine. The portion of the link-back at $1a$ is straight as shown on the drawings. The ends $2$ of the C obtained in this manner are, after the bending, sawed off in a sawing machine in such a manner that the distance "$a$" between said end faces is slightly larger than the length "$b$" of a filling piece $3$ (Fig. 2) or $4$ (Fig. 3) adapted to fill up the opening. The filling pieces $3$ or $4$ are premoulded in dies. It is remarked that when using stud pieces $4$ the fibre-direction of the material in the stud head is in the longitudinal direction of the link.

Thereafter the bent link body $1$ is clamped firmly with its bent portion in two clamps $5$ and $6$ of an electrical welding machine as schematically shown in Fig. 4. Thereupon the link body is heated electrically or otherwise to the bending temperature of about 600° C. at the midportion of the straight back, and the stud piece $4$ (or the filling piece $3$) is then clamped in the machine. The clamps $5$ and $6$ are pivotally connected to one another at $7$. By pivotally moving the clamps about the point $7$ the ends $2$ of the link body are simultaneously pressed against the ends of the stud piece $4$ and while passing through the electrical current are welded. The stud piece $4$ remains stationary in the machine.

It goes without saying that the successive links of a chain are hooked into one another before they are brought into the welding machine or before the stud piece or the filling piece is inserted.

After welding the burs are removed from the welding spaces and the chain is annealed.

As remarked above the welding is effected according to the flash welding system. To this end the parts to be welded are initially pressed against each other. Now, if the electrical current is passed through, the welding section or area is heated. As soon as a temperature of about 600° C. or 700° C. at the welding section or area is attained the rods are separated from one another a distance of about 0.5–1 mm. by correspondingly moving the clamps $5$ and $6$. The current, however, is still supplied and in this manner an electrical arc is obtained. The formation of the arc may, of course, be repeated. The clamps are then slowly moved towards one another and under an intense shower of sparks a portion of each rod (5-10 mm., according to the circumstances) is melted off. This melting off is continued until the ends of the rods are white hot (±1200° C.) whereafter the two rods are rapidly and forcibly pressed against each other (so-called up-setting). The welding process is now terminated.

The link has then obtained the shape shown in Fig. 5 in which the initially straight portion 1a of the back is also bent.

The main part of the machine will now be described.

In Fig. 6 the welding transformer and the clamping pieces have been shown in the position they occupy during the heating of the back of the C, while Fig. 7 shows in what manner during the welding operation the electrical tension is applied to the stud piece on the one hand and each of the link ends on the other hand.

As already remarked the leg of the stud piece is to this end electrically insulated with respect to the back of the C. The current is supplied in a manner to be explained hereinafter.

Figure 9:
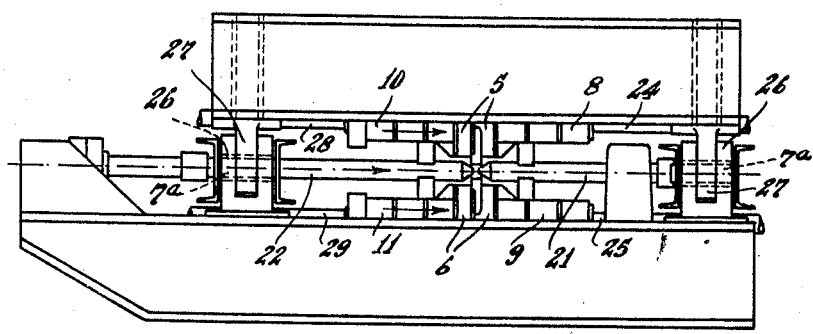
Fig. 9 is a side elevation of this device.

It follows from Figs. 4, 8, and 9 that the clamps 5, 6 each comprise two pairs of parts. The parts of the clamps 5 are in pairs secured upon sleeves 8, 10, where the parts of the clamps 6 are mounted upon sleeves 9, 11. Rods 24, 25 attached to the sleeves 8, 9 are adapted to adjust said sleeves longitudinally and may be locked in position in accordance with links of different size. The rods 28, 29 form piston rods in the sleeves 10, 11 and are adapted to be pressed hydraulically by means of a piston against the link ends in the direction indicated by arrows.

The sleeves are slidable between profile-irons 12, 13 provided with arms 14, 15 by means of which they may be swung with respect to each other about the hollow pivots 7a of the brackets 26, 27. The arms 14 are by means of links 16, 17 pivotally connected to the head of a rod 18 carrying a piston 19, which is slidable in a stationary hydraulic cylinder 20. The supply and discharge of the pressure medium determines the movement of the clamps 5, 6 about the pivots 7a and thereby the bending of the C. The sleeves 8, 9, 10, and 11 and pressure rods 24, 25, 28, 29 partake in this movement.

Figure 10:
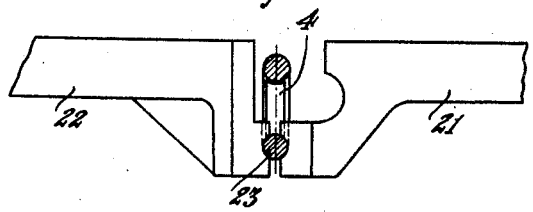
Fig. 10 shows a detail of the stud of a filling-piece-clamping-device.

Pressure rods 21, 22 passing through the hollow pivot 7a are electrically insulated with respect to the clamps and the machine frame. Between said rods the stud piece 4 (Fig. 3) is positioned in such a manner that the link portion 23 thereof is engaged (Figs. 10 and 4). The current thus needs only to take a very short path through the metal of the stud piece and the device is thereby also adapted to operate with filling pieces 3 (Fig. 2).

The rod 21 is stationary but adjustable, while the rod 22 is adapted to be hydraulically pressed in the direction of the arrow in Fig. 9. When the clamps are rotated to bend the link ends the rods 21, 22 are locked against rotation, so that the stud piece will be positioned correctly midway the link. The rods 21, 22 are mounted in ball bearings.

The rods 21, 22 are located in the axis of rotation of the device, whereas the clamping places (Fig. 10) are arranged eccentrically. By adjusting the rods about their axes by means of an operating arm the place of engagement of the part 23 of the stud piece or the filling piece respectively may be altered. Seeing that all of the clamping and pressure pieces are under current and are movable or adjustable, the current is supplied thereto by non-shown U-shaped strips of sufficient cross sectional area, which are resilient by reason of the fact that they are made of copper-foil or are laminated so as to be composed of thin U-shaped elements. The U-shaped elements or strips are rigidly connected to other similar U-shaped strips, the curved portion of which is located in a plane making an angle, preferably a right angle, with the plane in which the curved portion of the first strip is located.

I claim:

1. A method for making electrically welded chain links by the flash welding system from metal rods initially bent in the shape of a C, and filling pieces consisting in passing an electric current through the back portion of the C-shaped rod to heat the latter, positioning the filling piece in the gap between the ends of the C-shaped rod and bending the back of the latter to press the end faces thereof against the ends of said filling piece, and applying welding current to both ends of the C-shaped rod and to the filling piece, the current applied to both ends of the C-shaped rod having the same polarity differing from the polarity of the filling piece, and electrically insulating said filling piece from the back of said C-shaped rod.

2. A method for making electrically welded chain links by the flash welding system from metal rods initially bent in the shape of a C, and filling pieces consisting in passing an electric current through the back portion of the C-shaped rod to heat the latter, positioning the filling piece in the gap between the ends of the C-shaped rod and bending the back of the latter to press the end faces thereof against the ends of said filling piece, and applying welding current to both ends of the C-shaped rod and to the filling piece, the current applied to both ends of the C-shaped rod having the same polarity differing from the polarity of the filling piece.

FRANS CHRISTIAAN RAUWENHOFF.